United States Patent
Weekamp et al.

[11] Patent Number: 5,851,895
[45] Date of Patent: Dec. 22, 1998

[54] METHOD OF MAKING RC ELEMENT

[75] Inventors: Johannes W. Weekamp; Gerjan F. A. Van De Walle, both of Eindhoven, Netherlands

[73] Assignee: U.S. Philips Corporation, New York, N.Y.

[21] Appl. No.: 721,917

[22] Filed: Sep. 27, 1996

[30] Foreign Application Priority Data

Sep. 27, 1995 [EP] European Pat. Off. ............. 95202597

[51] Int. Cl.⁶ ............................. H01L 21/20; B05D 5/12
[52] U.S. Cl. ............................ 438/384; 427/79; 427/101
[58] Field of Search ..................... 427/79, 101; 438/382, 438/384, 396

[56] References Cited

U.S. PATENT DOCUMENTS

| | | | |
|---|---|---|---|
| 3,718,565 | 2/1973 | Pelletier | 427/101 |
| 4,283,485 | 8/1981 | Muenz et al. | 427/101 |
| 4,342,143 | 8/1982 | Jennings | 427/79 |
| 4,480,376 | 11/1984 | Hakanson | 427/101 |
| 5,494,845 | 2/1996 | Sereda et al. | 438/384 |

FOREIGN PATENT DOCUMENTS

3125281A1  1/1983  Germany .................. H01G 4/40

*Primary Examiner*—Richard A. Booth
*Attorney, Agent, or Firm*—Norman N. Spain

[57] ABSTRACT

The invention relates to a hybrid RC element and to a simple method of manufacturing such an element. The inventive hybrid RC element comprises a capacitor body and a resistor body. Said element is characterized in that it includes a block-shaped, ceramic capacitor body which is provided with a contact layer on two parallel surfaces, and in that a block-shaped, ceramic resistor body is provided on one of said contact layers, the surface of the resistor body facing away from the capacitor body also being provided with a contact layer. The resistor body is preferably made from doped Si. The inventive hybrid RC element is very suitable for applications in which the element is exposed to high voltage pulses (1 kV or more). Unlike the known hybrid RC elements, the element in accordance with the invention is not subject to short-circuits under these conditions.

4 Claims, 1 Drawing Sheet

METHOD OF MAKING RC ELEMENT

BACKGROUND OF THE INVENTION

1. Field of the Invention

The invention relates to a hybrid RC element comprising a capacitor body and a resistor body. The invention also relates to a method of manufacturing such a hybrid RC element. RC elements of this type are generally used in electronic equipment, more particularly circuits for electronic filters.

2. Discussion of the Related Art

Hybrid RC elements are known per se. For example, in German Patent Application DE 31.25.281 a description is given of a hybrid RC element. Said element comprises a multilayer capacitor and a resistive layer. In the known RC element, the resistive layer is provided on a side face of the capacitor, for example, by means of thin-film or thick-film technology. Dependent upon the way in which the contact layers of the capacitor and the resistor are interconnected, these two passive components are connected in parallel or in series.

The known hybrid RC element has the drawback that it cannot be used in conditions in which the element is exposed to high voltage pulses; that is to say, voltage pulses of one kV or more. Under such conditions the RC element can break down. For this reason, discrete capacitor and resistor elements are generally used for this application. However, the use of discrete R and C elements has the important disadvantage that installation of said elements takes up much space and time and is therefore expensive.

SUMMARY OF THE INVENTION

It is an object of the invention to obviate the above-mentioned disadvantages. The invention more particularly aims at providing a hybrid RC element which can withstand voltage pulses of one kV or more. Said hybrid RC element should also be cheap to manufacture and economical in use.

These and other objects of the invention are achieved by a hybrid RC element of the type mentioned in the opening paragraph, which is characterized in that the element includes a block-shaped, ceramic capacitor body which is provided with a contact layer on two parallel surfaces, and in that a block-shaped, ceramic resistor body is provided on one of said contact layers, the surface of the resistor body facing away from the capacitor body also being provided with a contact layer.

The invention is based on the recognition that the known hybrid RC elements become deranged when they are subjected to applications in which high voltage pulses ("flashes") are passed through the element, because the heat dissipation from these elements is insufficient. This is caused, in particular, by the poor heat dissipation in the relatively thin resistive layer. As a result of such high voltage pulses, parts of the thin-film or thick-film resistive layer are heated considerably. When such a resistive layer is locally heated, the heat can dissipate only in two dimensions, so that the layer can melt. This causes an electrical short-circuit in the hybrid element. If, however, a block-shaped, ceramic resistor body is used, this phenomenon does not occur. Such a body exhibits thermal conduction throughout the body (three-dimensional) and not only through a thin resistive layer (two-dimensional). By virtue thereof, heat can be dissipated throughout the resistance block, so that the locally generated heat cannot lead to melting of the resistance material. As a result, the risk of breakdown is relatively small.

A preferred embodiment of the hybrid RC element in accordance with the invention is characterized in that the ceramic resistor body comprises doped Si. This material exhibits excellent thermal conduction, so that heat dissipation in the resistor body during high voltage pulses is no problem at all. The exact resistance value cannot only be set by adapting the distance and the surface of the contacts, but also by varying the quantity and the type of dopant used. Both P- and N-doped Si can be used as the resistive material. Good results are obtained with P-doped Si and with β-doped Si. The degree of doping was about 100 $(\Omega\text{-cm})^{-1}$.

Another interesting embodiment of the hybrid RC element is characterized in that a continuous channel is provided in the block-shaped resistor body, which channel divides the contact layer of the block-shaped resistor body facing away from the capacitor body into two separate sub-contact layers. By virtue of this channel, an RCR-T filter can be manufactured in a simple and cost-effective manner. Such a filter is frequently used as an EMI suppressor in electronic circuits. The resistance values can also be set by the depth of the channel. If desired, the channel can extend as far as the common contact surface between the resistor body and the capacitor body. In this case, the resistor body is divided into two separate sub-bodies.

The invention also relates to a method of manufacturing a number of hybrid RC elements, each comprising a capacitor body and a resistor body. In accordance with the invention, the method comprises the following steps:

provision of a first and a second contact layer on a plate-shaped body of a dielectric material, provision of a first and a second contact layer on a plate-shaped body of a resistance material, formation of a double layer of both plate-shaped bodies by interconnecting the first contact layers of the bodies, division of the double layer into a number of hybrid RC elements which comprise a block-shaped capacitor body and a block-shaped resistor body.

In principle, all suitable types of dielectric materials can be used for the plate-shaped body. It has been found, however, that a ceramic material based on doped barium-titanate is particularly suitable. The contact layers are made of an electrically conducting material, such as metals and metal alloys. Said contact layers can be provided by means of screen printing, vacuum evaporation, sputtering or otherwise.

The double layer can be formed by alloying one contact layer of each late-shaped body at a high temperature and under pressure. Said double layer can be subdivided in known manner, for example by wire sawing, cutting, breaking or laser cutting. A continuous channel may optionally be provided in the resistor part, preferably, by means of the wire-sawing technology, which is known per se.

An advantageous embodiment of the method in accordance with the invention is characterized in that a continuous channel is provided in the block-shaped resistor body of the RC element, so that the contact layer of the resistor body facing away from the capacitor body is divided into two separate sub-contact layers. This method enables so-called RCR-T filters to be manufactured in a simple and cheap manner.

Another advantageous embodiment of the method in accordance with the invention is characterized in that an electrical connection is attached to the exposed contact layers of the RC elements. The provision of electrical connections on the exposed contact layers of the RC elements also takes place in known manner. For this purpose, use can be made of conventional wire connections which are secured by means of solder. It is alternatively possible, however, to provide the hybrid RC elements in accordance with the invention with such end faces that said elements can be used as an SMD component. If desired, the hybrid element is provided with a housing which leaves the ends of the electrical connections clear.

It is noted that the technologies required to manufacture the hybrid RC elements in accordance with the invention are well known per se. By virtue thereof, these elements can be manufactured at very low costs.

BRIEF DESCRIPTION OF THE DRAWINGS

These and other aspects of the invention will be apparent from and elucidated with reference to the embodiments described hereinafter.

In the drawings.

It is noted that, for clarity, the Figures are not necessarily drawn to scale.

DETAILED DESCRIPTION OF THE PREFERRED EMBODIMENTS

Figure 1:
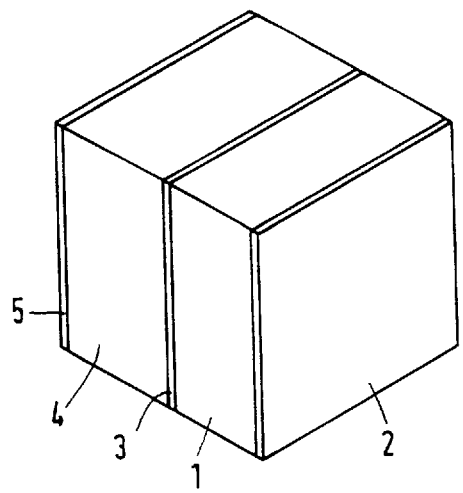
FIG. 1 shows a first embodiment of a hybrid RC element in accordance with the invention.

FIG. 1 is a perspective view of a first embodiment of the hybrid RC element in accordance with the invention. This element is composed of a block-shaped capacitor body 1 which is provided with a contact layer 2 and a contact layer 3 on two parallel surfaces. In the present case, the capacitor body consists of a sintered, ceramic material on the basis of doped barium titanate (X7R; Philips). The contact layers consist of a layer of Pd/Ag which is provided by means of screen printing. A block-shaped resistor body 4 is provided on the contact layer 3. In this case, said resistor body is made from P-doped Si. The resistor body is provided with a contact layer 5 on the surface facing away from the capacitor body. This contact layer also consists of a layer of Pd/Ag, which is provided by screen printing. Contact layer 3 serves as a common contact layer between the capacitor body and the resistor body. If desired, electrical connections in the form of metal wires (not shown) can be provided on the contact layers 2 and 5.

In actual fact, the length and the width of the capacitor body and the resistor body are 0.8 mm. The thickness of the capacitor body and of the resistor body is 0.3 and 0.5 mm, respectively. Experiments have shown that the hybrid element can successfully withstand voltage pulses of 2 kV. Breakdown did not occur.

Figure 2:
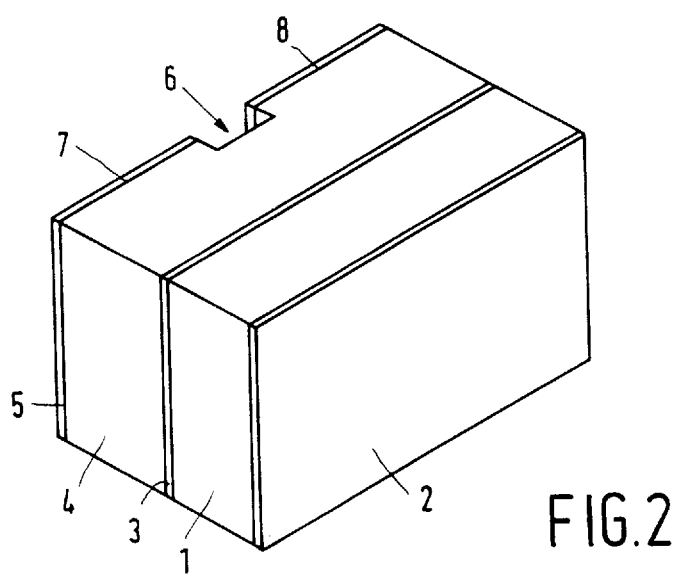
FIG. 2 shows a second embodiment of a hybrid RC element in accordance with the invention, FIG. 3 schematically shows a number of steps of the inventive method for the manufacture of hybrid RC elements.

FIG. 2 is a perspective view of a second embodiment of the hybrid RC element in accordance with the invention. The capacitor body, the resistor body and the contact layers are made from the same material as in the first embodiment. The width and the thickness of the various layers are also the same as in the first embodiment. In the second embodiment, the length of the capacitor body is 1.8 mm. The corresponding elements of FIG. 1 and FIG. 2 bear the same reference numerals.

In the second embodiment, a continuous channel 6 is formed in the contact layer 5 and in the resistor body 4. This channel divides the contact layer 5 of the block-shaped resistor body 4 into two sub-contact layers 7 and 8. The channel extends to within the resistance material of doped Si. The channel 6 is provided by means of wire sawing. Dependent upon the depth of the channel, an RCR-T filter (as shown) or a hybrid component in which the three elements are connected in series (not shown) is obtained. In the latter case, the channel should extend to within the dielectric material of the capacitor. The RCR-T filter manufactured exhibits a good resistance to high voltage pulses of 2 kV. Breakdown did not occur.

Figure 3:
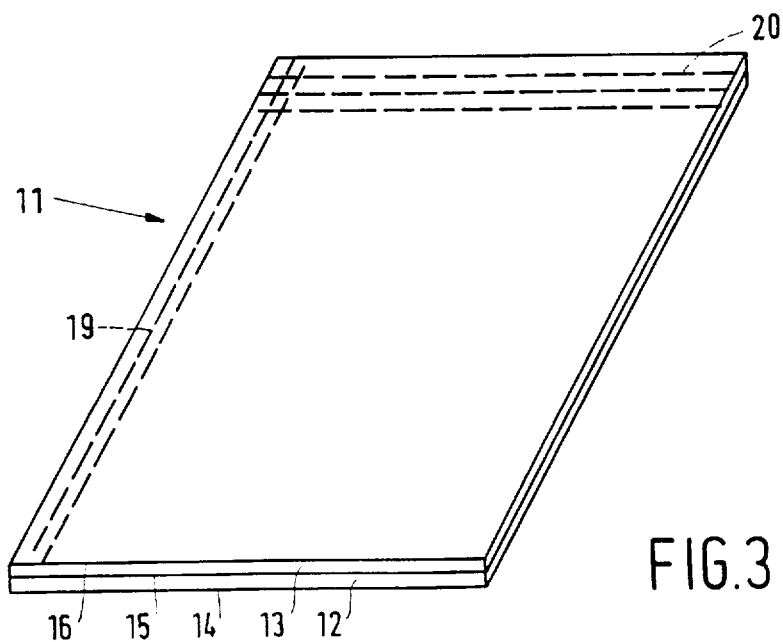

With reference to FIG. 3, it is explained how the hybrid RC elements in accordance with the first embodiment are manufactured. FIG. 3 shows a double layer 11 which is composed of a plate-shaped body 12 of a dielectric material, a plate-shaped body 13 of a resistor material as well as contact layers 14, 15 and 16. The length, width and thickness of the double layer are 110×80×1 mm.

The double layer shown is manufactured as follows. A plate-shaped body 12 of a dielectric material on the basis of barium titanate (X7R, Philips) is provided with contact layers 14 on both main surfaces. A plate-shaped body 13 of a resistor material in the form of doped Si is also provided with contact layers 16 on both main surfaces. Said contact layers are made of a Pd/Ag alloy, which is provided on the bodies by means of screen printing. Subsequently, both bodies are brought into contact with each other via one of the contact layers 14 and 16. Said engaging contact layers 14 and 16 are alloyed to form a common contact layer 15 by exposing them to pressure and an elevated temperature. The double layer 11 thus formed is shown in FIG. 3.

A large number of hybrid RC elements can be obtained from said double layer 11. To this end, the double layer is first divided into a number of bars, for example by dividing the double layer along the (imaginary) bar-lines 19. The bars thus formed are subdivided, transversely to the longitudinal direction, into a large number of hybrid elements, for example along the imaginary element-lines 20. In this manner, many hundred hybrid RC elements can be manufactured in a simple manner. Dividing the double layer into bars and the bars into individual hybrid RC elements can be carried out in various ways, such as breaking, sawing or (laser) cutting.

If desired, the hybrid RC elements thus formed are provided with electrical connections, for example in the form of a solderable wire or a solderable plate. For the manufacture of an RCR-T filter, the elements can additionally be provided with a continuous channel in the resistor body. If desired, said RC element is further provided with an electrically-insulating, moisture-proof housing.

The hybrid RC element in accordance with the invention can very suitably be used for applications in which the element is exposed to high voltage pulses (1 kV or more). Unlike hybrid RC elements in accordance with the prior art, the inventive element is not subject to short-circuits under these conditions.

What is claimed is:

1. A method of manufacturing a number of hybrid RC elements, each comprising a capacitor body and a resistor body, said method comprising:

a) providing a first and a second electrically conductive contact layer on surfaces of a plate-shaped body of a dielectric material;

b) providing a first and a second electrically conductive contact layer on surfaces of a plate-shaped body of a resistance material;

c) bringing said first contact layers into contact with each other;

d) alloying together said thus contacted first layers to thereby form a double-layer of said plate-shaped bodies; and e) dividing said double-layer into a number of hybrid RC elements, each element comprising a block-shaped capacitor body and a block-shaped resistor body.

2. A method as claimed in claim 1 comprising forming a continuous channel in the surface of the block-shaped resistor element of each of the RC elements provided with one of second contact layers, extending to opposite edges of said surface, to thereby divide said one of the second contact layers into two separate contact sub-layers.

3. A method as claimed in claim 1 comprising providing electrical connections on the second contact layers on each of the RC elements.

4. A method as claimed in claim 2 comprising providing electrical connections on the second contact layers on each of the RC elements.

\* \* \* \* \*